US012157245B2

(12) United States Patent
Penazzi et al.

(10) Patent No.: US 12,157,245 B2
(45) Date of Patent: Dec. 3, 2024

(54) APPARATUS FOR CUTTING CAPS

(71) Applicant: SACMI Cooperativa Meccanici Imola Societa' Cooperativa, Imola (IT)

(72) Inventors: Davide Penazzi, Imola (IT); Stefano Bergami, Castel San Pietro Terme (IT); Ruggero Menzolini, Imola (IT)

(73) Assignee: SACMI Cooperativa Meccanici Imola Societa' Cooperativa (IT)

( * ) Notice: Subject to any disclaimer, the term of this patent is extended or adjusted under 35 U.S.C. 154(b) by 14 days.

(21) Appl. No.: 17/632,866

(22) PCT Filed: Jul. 15, 2020

(86) PCT No.: PCT/IB2020/056649
§ 371 (c)(1),
(2) Date: Feb. 4, 2022

(87) PCT Pub. No.: WO2021/020456
PCT Pub. Date: Feb. 11, 2021

(65) Prior Publication Data

US 2022/0281130 A1 Sep. 8, 2022

(30) Foreign Application Priority Data

Aug. 5, 2019 (IT) ........................ 102019000014004

(51) Int. Cl.
*B26F 1/18* (2006.01)
*B26D 7/01* (2006.01)

(52) U.S. Cl.
CPC .................. *B26F 1/18* (2013.01); *B26D 7/01* (2013.01); *B26F 2210/04* (2013.01)

(58) Field of Classification Search
CPC ..... B26F 2210/04; B26F 1/18; B65D 41/3428
See application file for complete search history.

(56) References Cited

U.S. PATENT DOCUMENTS

| | | | | |
|---|---|---|---|---|
| 5,809,860 | A | 9/1998 | Haaser | |
| 6,826,994 | B1 * | 12/2004 | Liao | B29C 59/007 425/291 |
| 7,673,543 | B2 | 3/2010 | Albonetti | |
| 2007/0089587 | A1 | 4/2007 | Liao | |
| 2012/0285302 | A1 * | 11/2012 | Bergami | B26D 3/08 83/13 |
| 2016/0354946 | A1 * | 12/2016 | Sain | B26D 7/06 |

FOREIGN PATENT DOCUMENTS

| | | | | |
|---|---|---|---|---|
| CN | 208195760 | U * | 12/2018 | B23C 1/00 |
| DE | 19933497 | A1 * | 1/2001 | B26D 7/2628 |
| EP | 0533633 | A2 * | 3/1993 | |
| WO | WO-2004110711 | A2 * | 12/2004 | B26D 3/166 |

* cited by examiner

*Primary Examiner* — Jennifer S Matthews
(74) *Attorney, Agent, or Firm* — LAUBSCHER & FRETWELL, P.C.

(57) ABSTRACT

A cutting apparatus is disclosed to form a weakening line of a of an anti-tampering device of a cap made of plastics for closing a container, in which the cutting apparatus includes a feeding device for feeding the caps along a feeding path, a blade arranged in the feeding path to form the weakening line, at least one abutting wall on which the cap can roll, and a micrometric screw configured for adjusting the corresponding position of the blade with respect to the abutting wall, so that blade wear can be compensated by advancing the blade to the feeding path of the caps independently of the abutting wall.

11 Claims, 11 Drawing Sheets

APPARATUS FOR CUTTING CAPS

BACKGROUND OF THE INVENTION

The invention relates to an apparatus for cutting caps, in particular for caps made of plastics for closing containers.

Specifically, but not exclusively, the apparatus in question can be usefully used to form a weakening line, or preferential breaking line, in an anti-tampering device of a cap for closing a container.

Cutting apparatuses are known for making the weakening line in an anti-tampering device of a cap, for example as shown in patent publications US 2012/0285302 A1 and U.S. Pat. No. 7,673,543 B2. Each of patent publications WO 2004/110711 A2, U.S. Pat. No. 5,809,860 A, US 2007/089587 A1 discloses an apparatus as in the preamble of claim 1.

One of the drawbacks of apparatuses of known type is constituted by blade wear, which entails various negative consequences, such as the progressive decrease in cutting efficiency, the risk of generating vibrations during operation of the apparatus, undesired and uncontrolled modification of the morphological features of the weakening line, the need to replace the blade periodically, relatively short working life of the blade, etc.

Another drawback is that in general the blade of the cutting apparatus has to be replaced when the cap size is changed to adapt the blade to the different operating conditions linked to the new size.

SUMMARY OF THE INVENTION

One object of the invention is to provide a cutting apparatus that is able to overcome one or more of the aforesaid drawbacks of the prior art.

One object of the invention is to provide an alternative solution to the problem of making a cutting apparatus that is suitable for forming a weakening line in a cap for closing a container.

One advantage is to vary the cutting configuration easily and practically, in particular by adjusting the position of the cutting edge of the blade with respect to the feeding path of the caps.

One advantage is to permit simple and practical compensation of the wear of the blade that forms the weakening line.

One advantage is enabling the cap size to be changed without the need to replace the blade by adapting the blade simply and rapidly to the different operating conditions linked to the new cap size.

One advantage is to make a constructionally simple and cheap cutting apparatus available.

One advantage is giving rise to a cutting apparatus in which rolling the cap by contact against an abutment is particularly effective, in particular owing to the fact that blade wear is compensated independently of the adjustment of the relative position between the cap and the abutment that influences rolling of the cap.

One advantage is making a cutting apparatus with a blade provided with a relatively long working life.

One advantage is to permit practical and effective adjustment of at least one feature, in particular a morphological feature, of the preferential fracture bridges that define a weakening line of an anti-tampering device of a closing cap of a container.

Such objects and advantages, and still others are achieved by a cutting apparatus according to one or more of the following claims.

In one embodiment, a cutting apparatus, suitable for forming a weakening line of an anti-tampering device of a cap, includes a feeding device for feeding the capsules along a feeding path, a blade extending along said feeding path for forming the weakening line, an abutting arrangement on which the caps can roll, and an adjusting arrangement configured for adjusting the corresponding position of the blade with respect to the abutting arrangement.

The cutting apparatus can be used, in particular, to perform an adjustment of the position of the blade, for example in order to compensate for blade wear, independently of the position of the abutting arrangement.

The cutting apparatus can be used, in particular, to perform an adjustment of the corresponding position between the blade and the feeding path of the caps independently of possible adjustment of the corresponding position between the abutting arrangement and the feeding path of the caps.

BRIEF DESCRIPTION OF THE DRAWINGS

The invention can be understood and implemented better with reference to the attached drawings that illustrate an embodiment thereof by way of non-limiting example in which.

DETAILED DESCRIPTION

Figure 1:
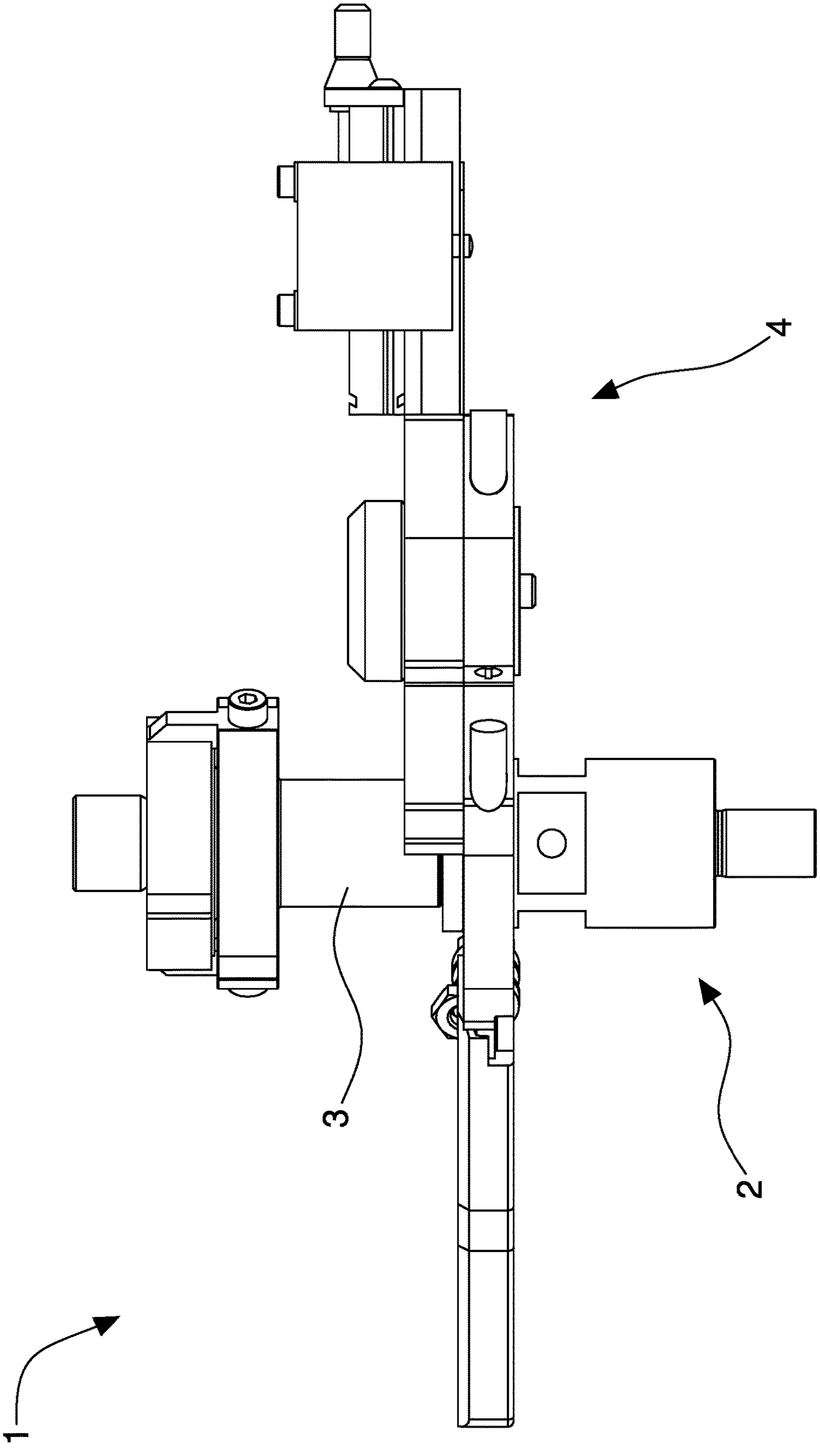
FIG. 1 is a vertical raised view of a first embodiment of a cutting apparatus according to the invention.
Figure 2:
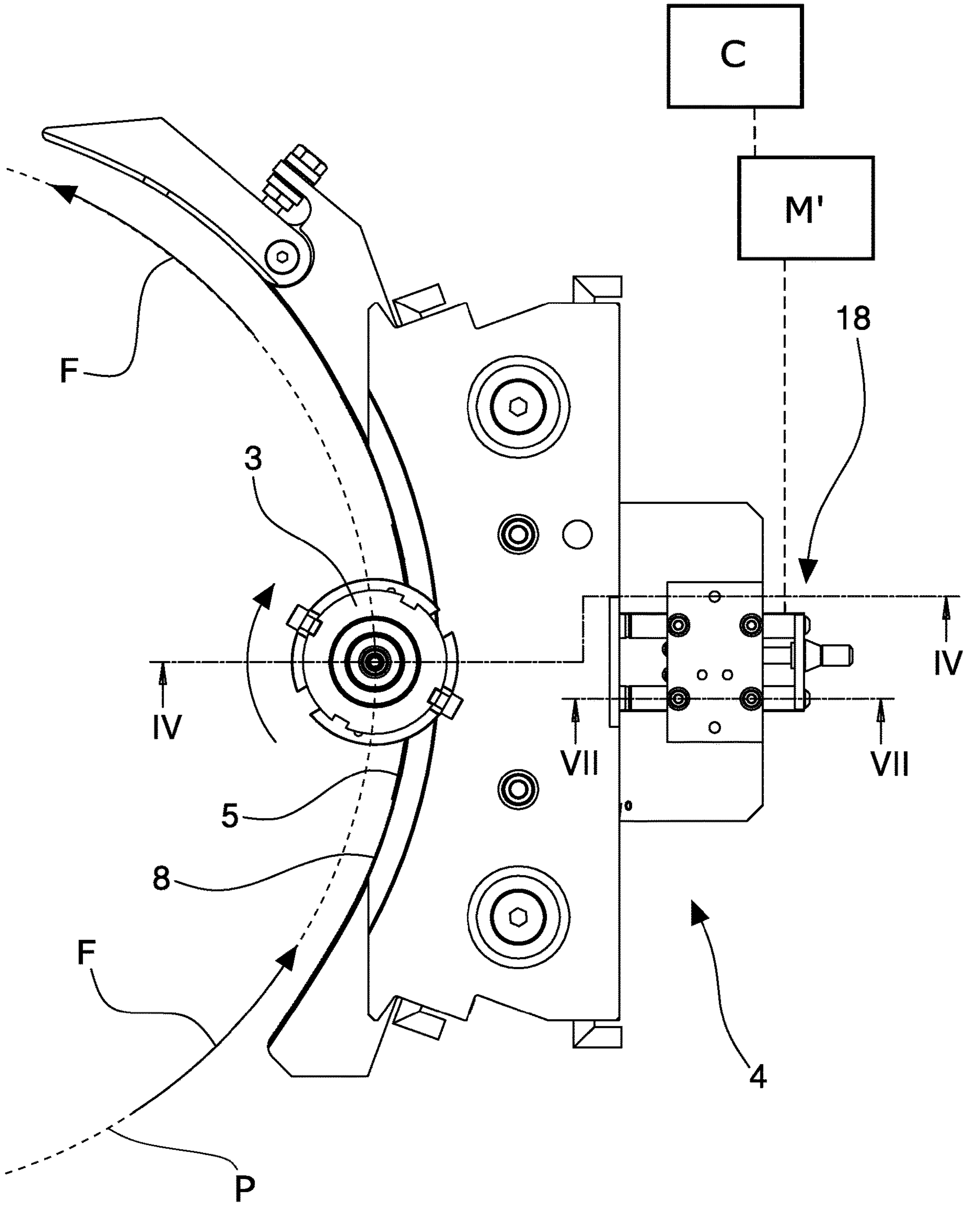
FIG. 2 is a top plan view of FIG. 1.
Figure 3:
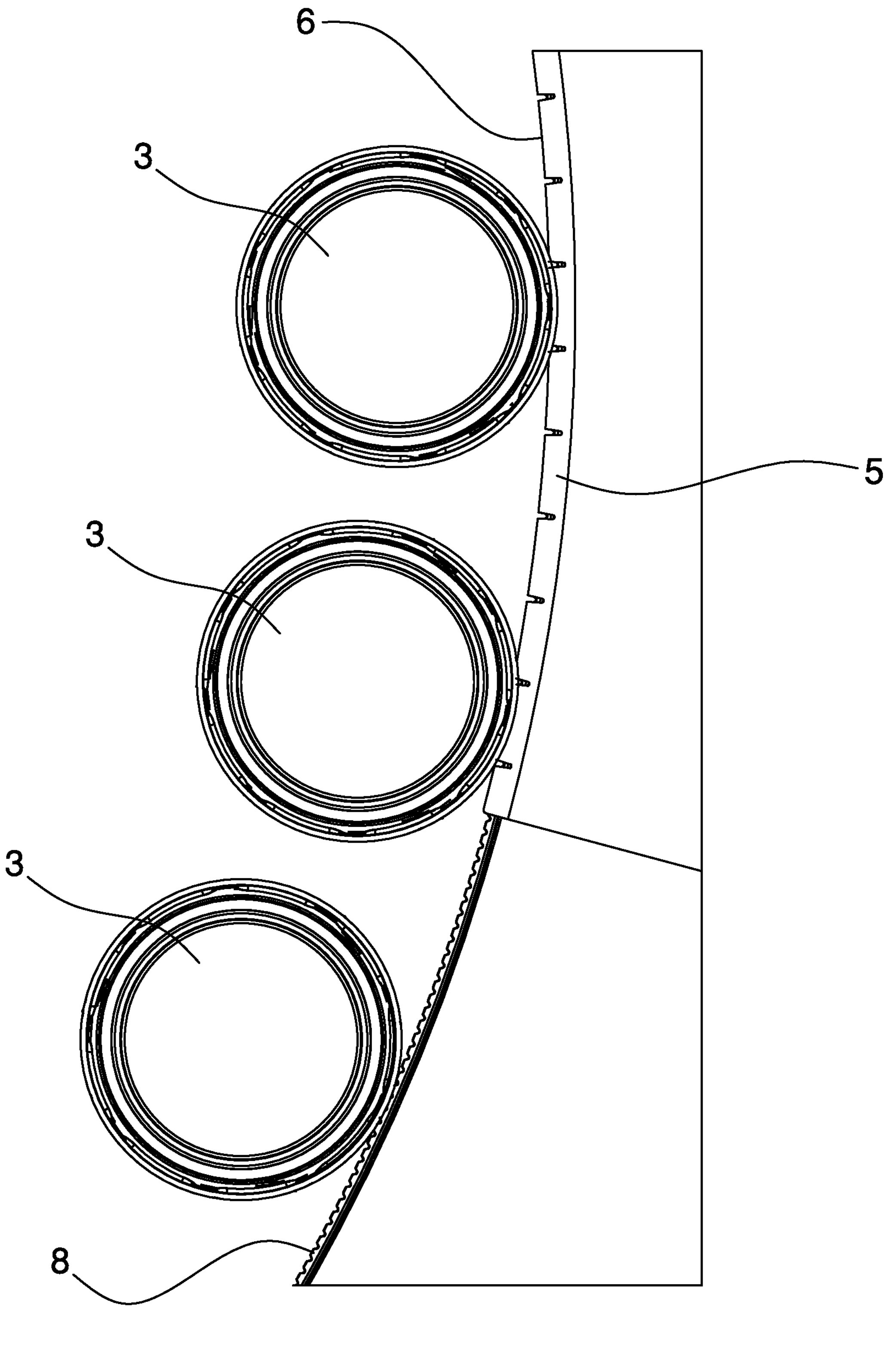
FIG. 3 shows an enlarged detail of FIG. 2.
Figure 4:
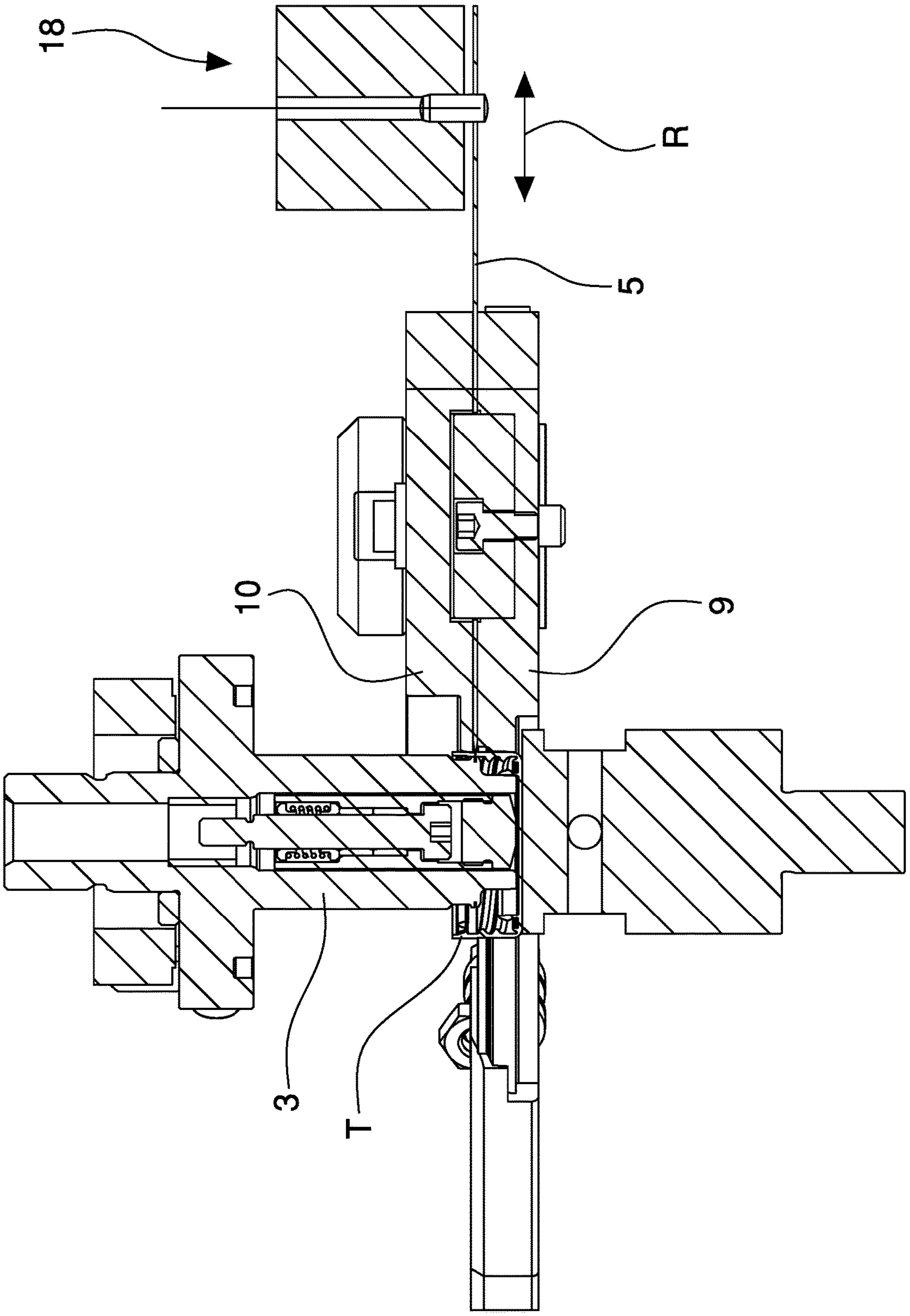
FIG. 4 is section IV-IV of FIG. 2.
Figure 5:
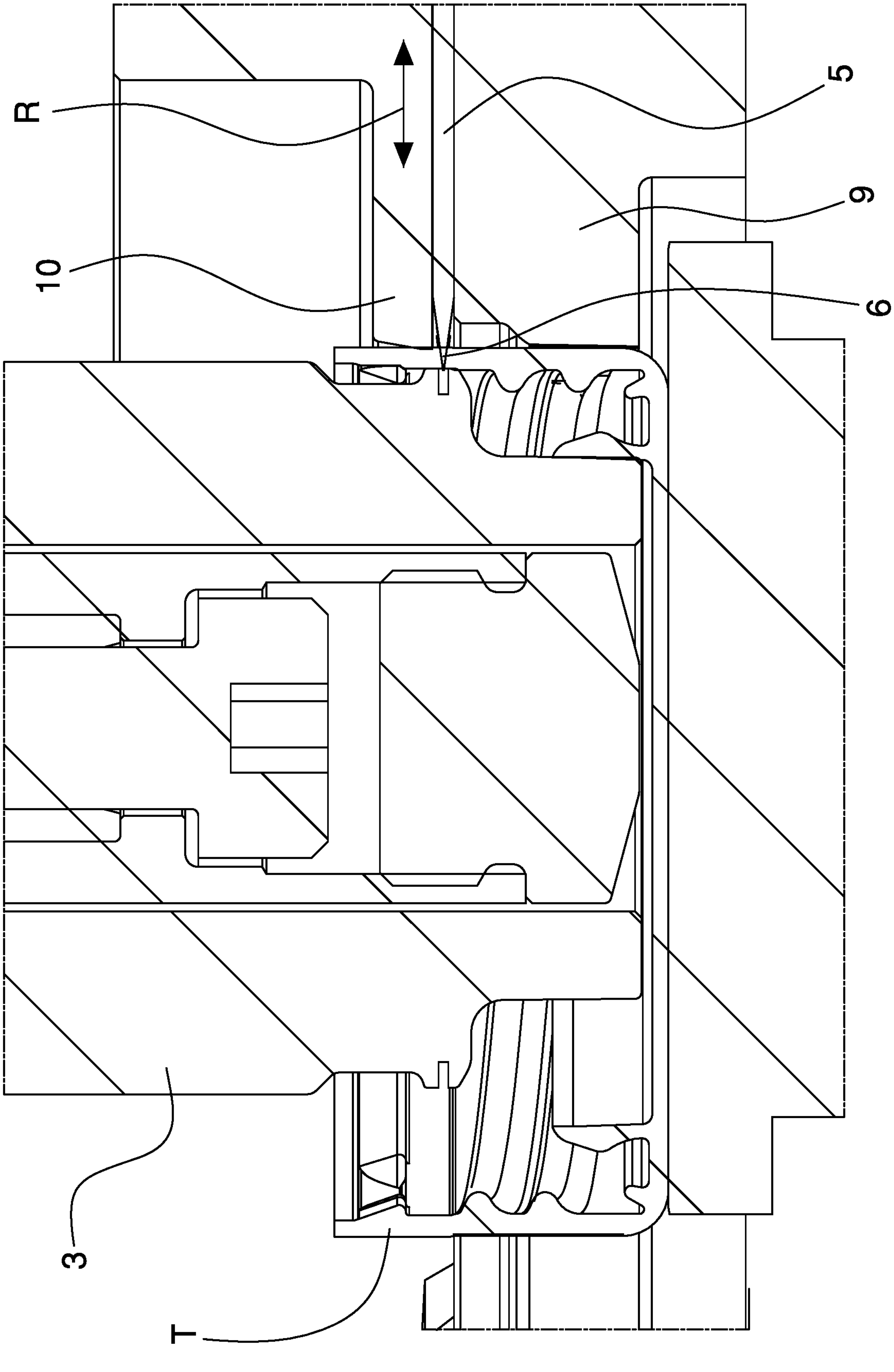
FIG. 5 shows an enlarged detail of FIG. 4.
Figure 6:
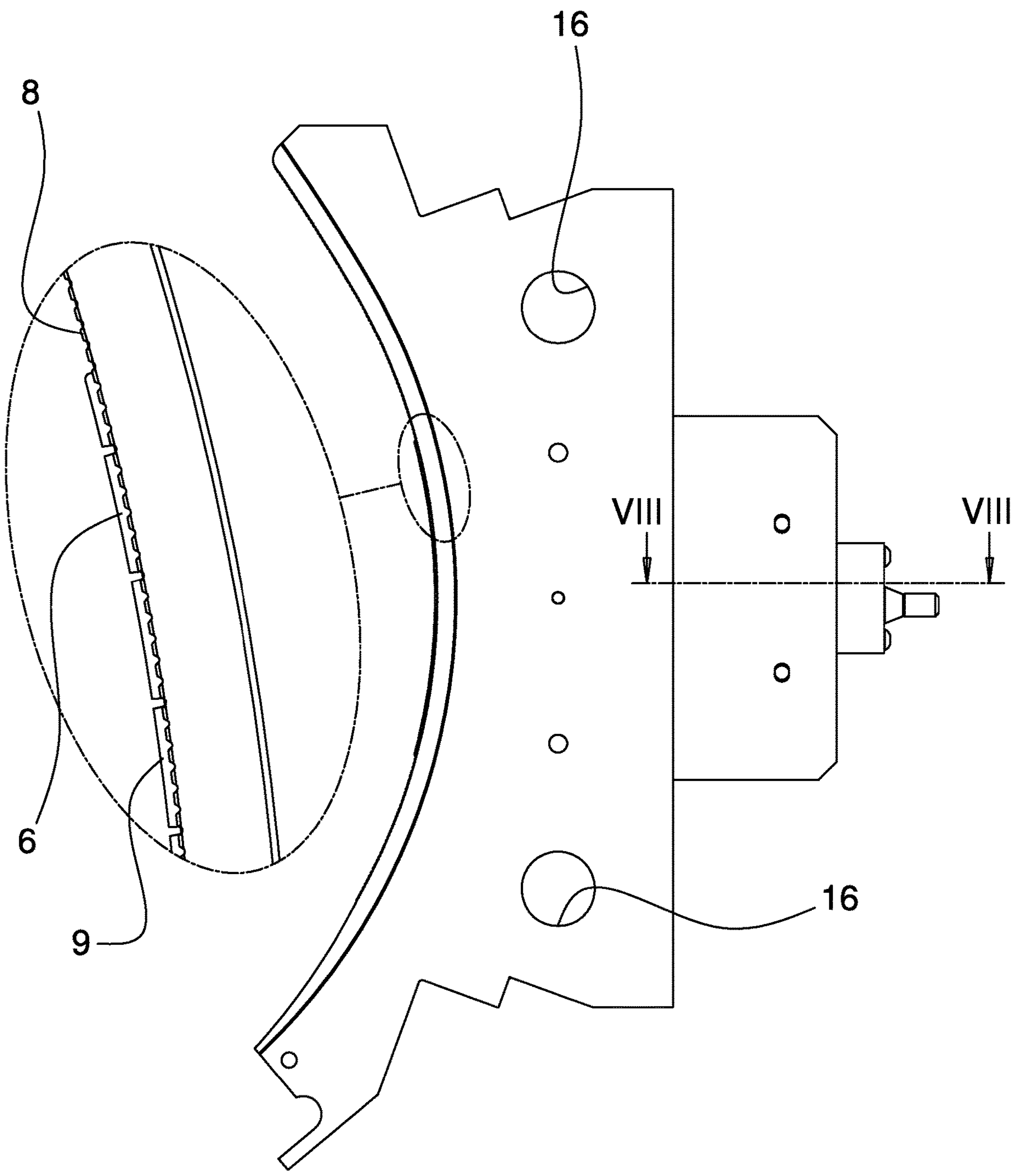
FIG. 6 is a partial bottom view of FIG. 1.
Figure 7:
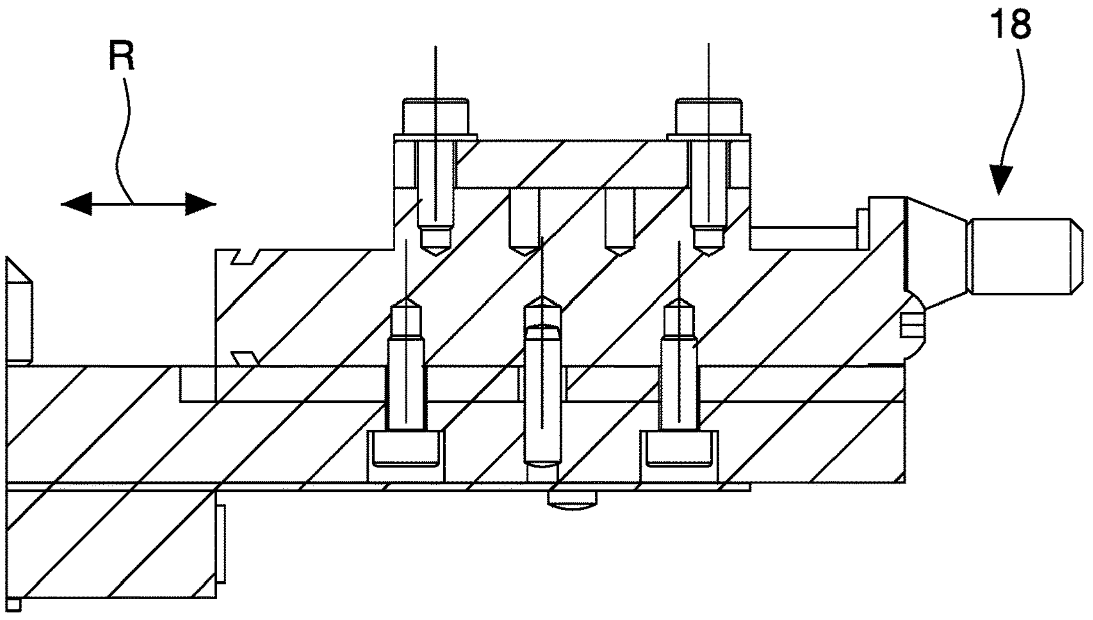
FIG. 7 is section VII-VII of FIG. 2.
Figure 8:
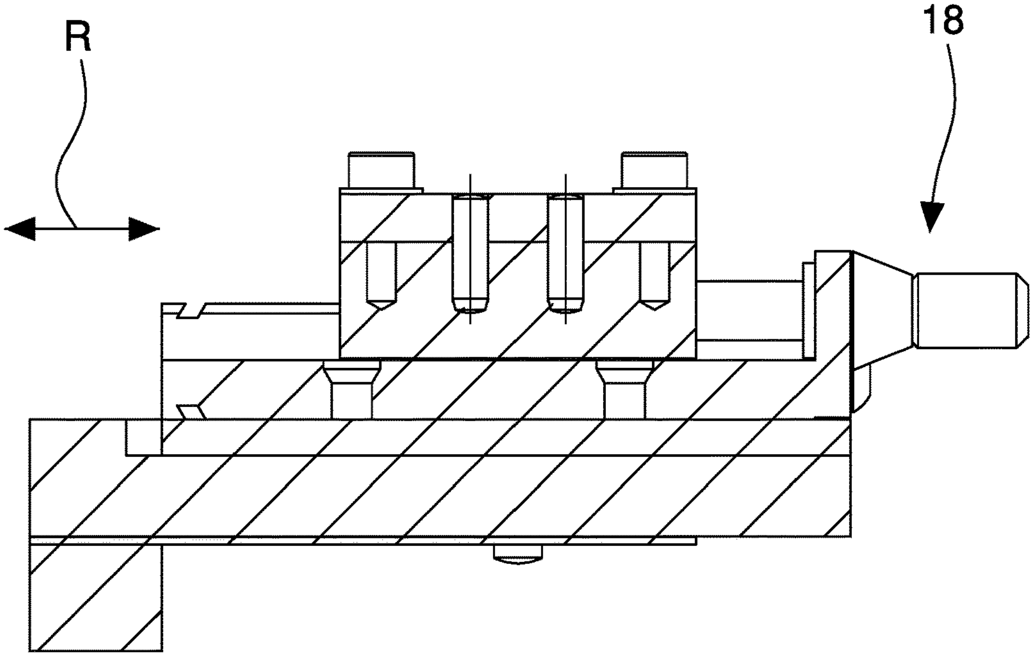
FIG. 8 is section VIII-VIII of FIG. 6.
Figure 9:
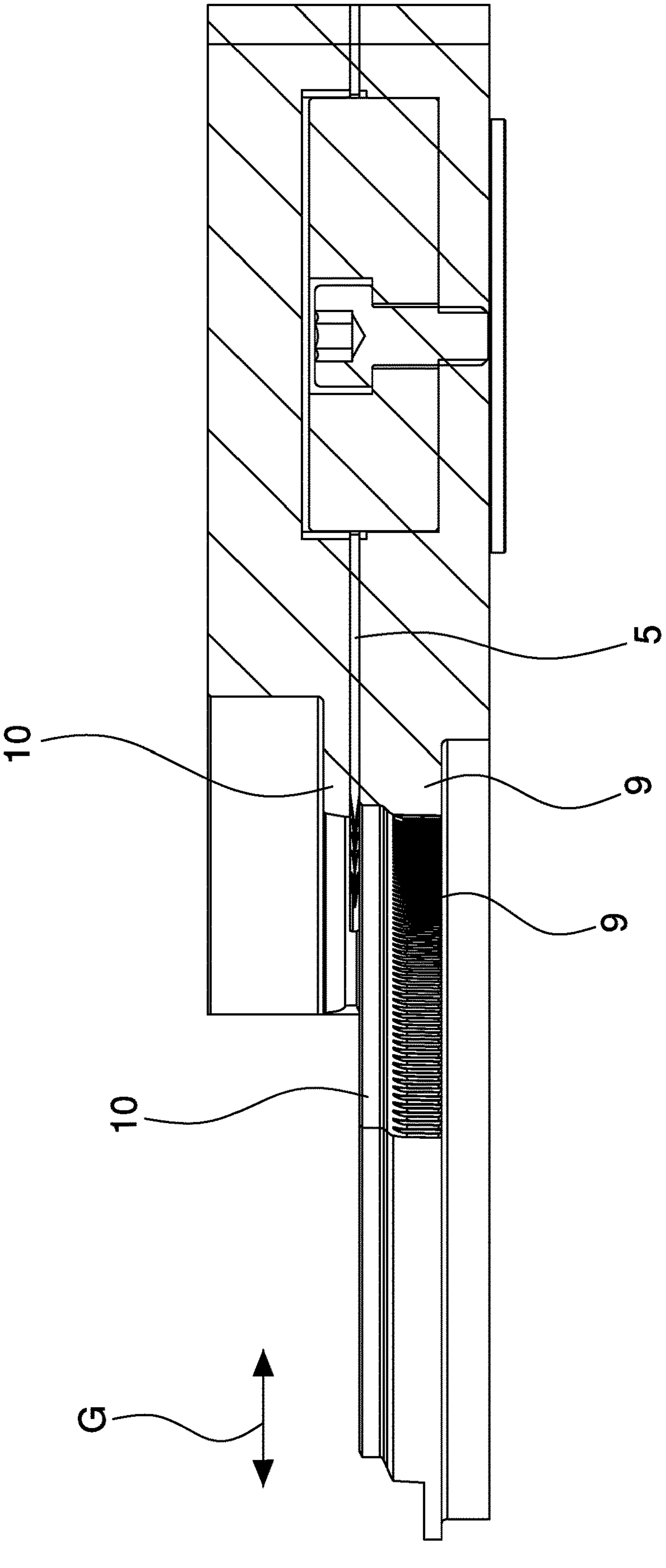
FIG. 9 shows an enlarged detail of FIG. 4 with certain parts removed to show others better.
Figure 10:
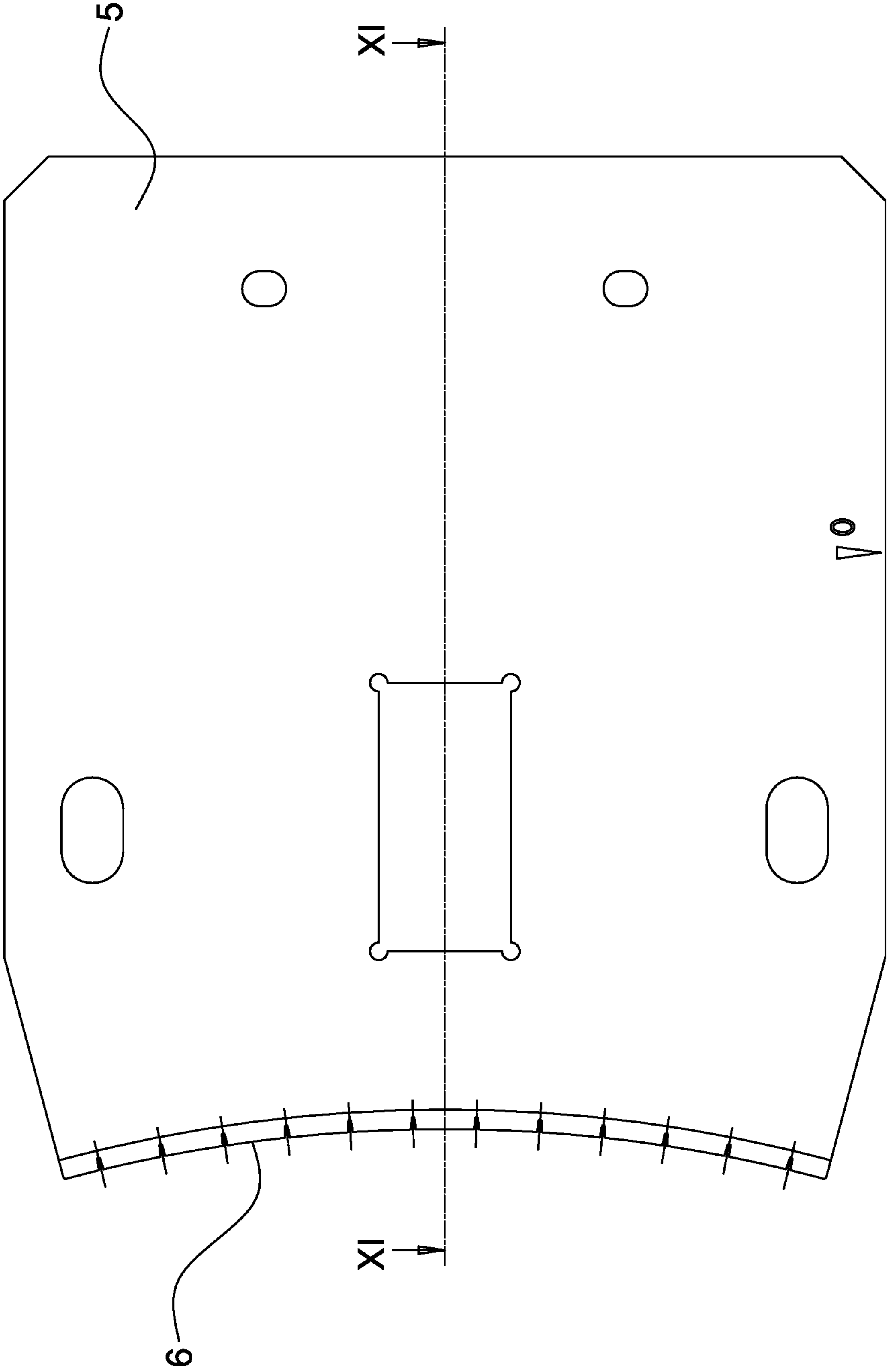
FIG. 10 is a plan view of the blade of the cutting unit.
Figure 11:
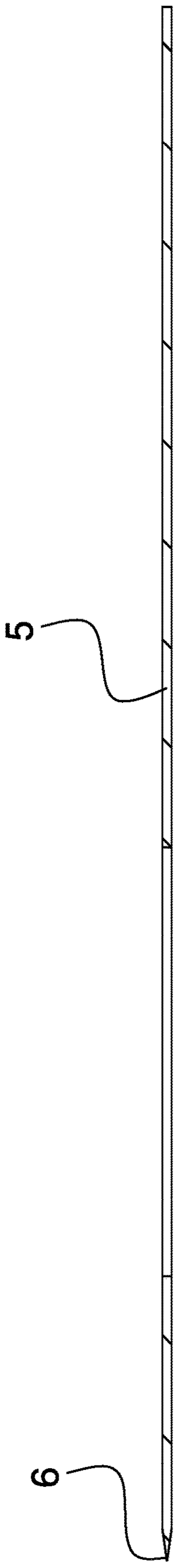
FIG. 11 is a section XI-XI of FIG. 10.
Figure 12:
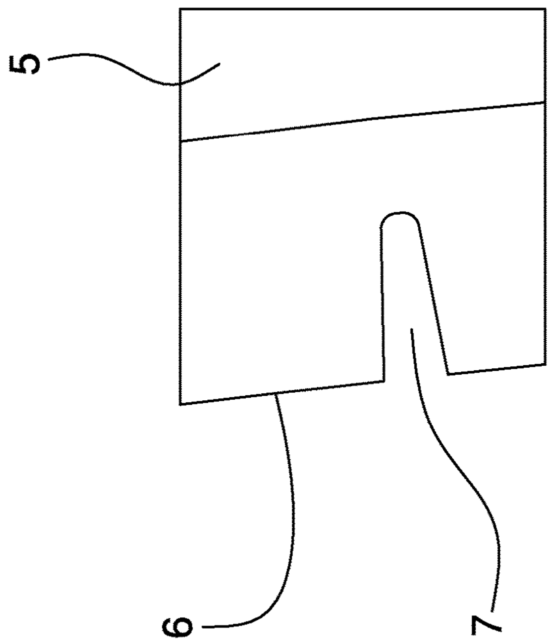
FIG. 12 shows an enlarged detail of FIG. 10.
Figure 13:
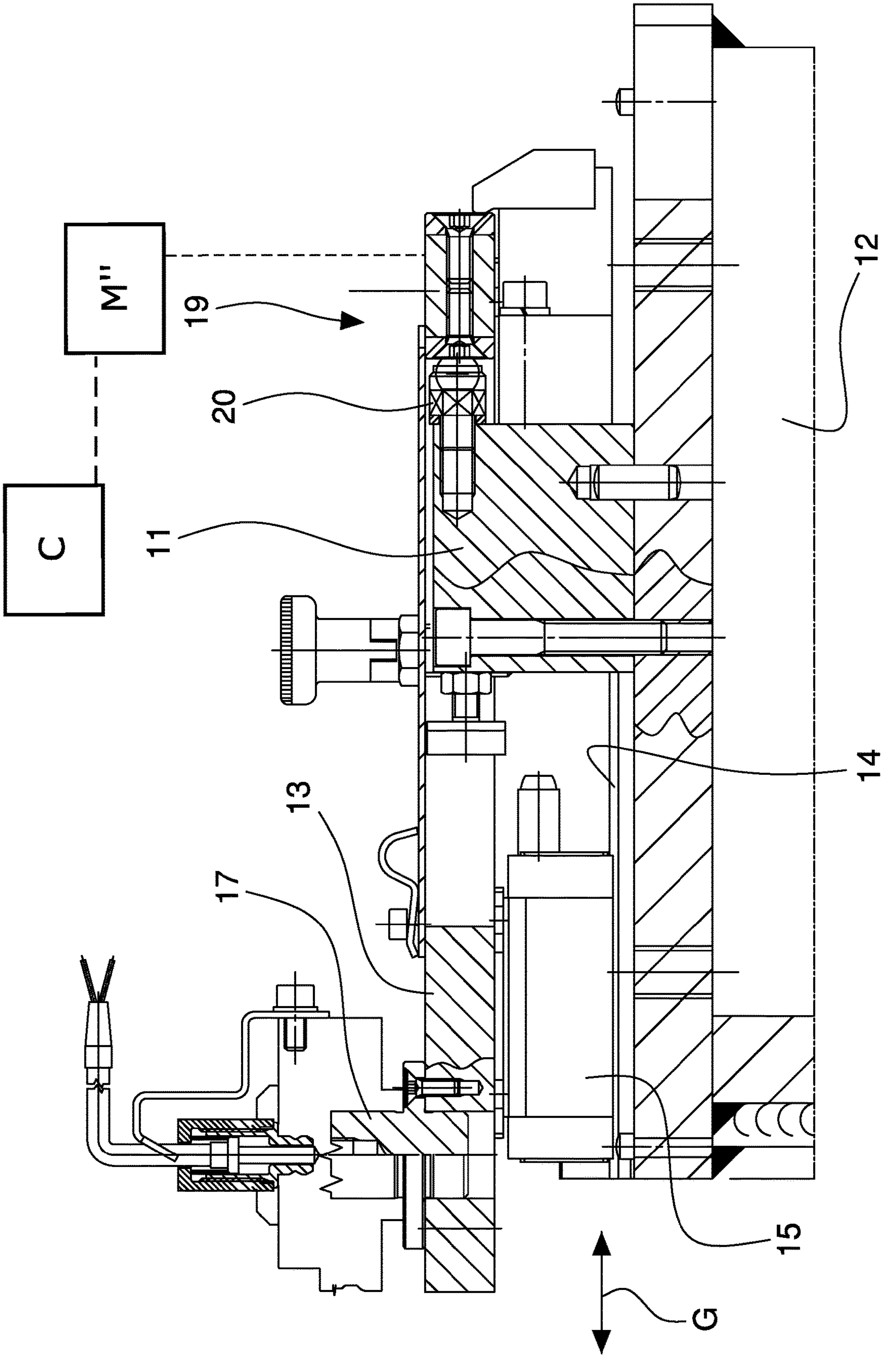
FIG. 13 is a section of the cutting apparatus of FIG. 1, according to a vertical section plane, that shows the second adjustment device for adjusting the position of the cutting unit.

With reference to the aforesaid figures, overall with 1 a cutting apparatus has been indicated. The cutting apparatus 1 can be used, in particular, for cutting caps T. The cutting apparatus 1 can be used, for example, for cutting caps T made of plastics. The cutting apparatus 1 can be used, in particular, for cutting caps T for closing containers. The cutting apparatus 1 can be used, for example, for forming a weakening line, or preferential breaking line, in an anti-tampering device of a cap T for closing a container.

The cutting apparatus 1 may include, in particular, a feeding path along which the caps T are fed in a feeding direction F. In particular, the feeding path may lie, as in this embodiment, on a feeding plane, for example a horizontal feeding plane.

The cutting apparatus 1 may include, in particular, a feeding device 2 configured for feeding the capsules T along the feeding path. The feeding device 2 may include, in particular, a spindle-holding carousel rotating around a vertical rotation axis.

The feeding device 2 may include, in particular, a plurality of spindles 3 each of which rotates on itself (around a rotation axis that is parallel to the rotation axis of the carousel) through a motor-driven command and is configured for engaging a cap T to rotate the cap on itself to perform cutting of a weakening line along a circumference of a side wall of the cap T. The spindles 3 may be arranged on the rotating spindle-holding carousel and may be distributed on the carousel spaced angularly apart from one another.

The feeding path of the capsules T may be defined by at least one portion of the circular trajectory that the rotating carousel makes the spindles 3 perform that engage the caps T.

The feeding device 2 of the capsules T may include, in particular, a feeding device of known type that is not disclosed here in greater detail.

The cutting apparatus 1 may include, in particular, a cutting unit 4 configured for forming a weakening line on a cap T fed by the feeding device 2 along the feeding path.

The cutting unit 4 may include, in particular, at least one blade 5 extending along the feeding path. The blade 5 may include, in particular, a cutting edge 6 lying on a cutting plane. The cutting plane may be, as in this embodiment, horizontal and/or parallel to the feeding plane of the caps T. The blade 5 may include, in particular, a relatively thin metal plate, with two dimensions (width and length) that are significantly greater than the third dimension (thickness) lying on the aforesaid cutting plane.

The blade 5 may be configured, in particular, for forming a weakening line with a circumferential extent, or at least partially circumferential extent, owing to the fact that the cap T that is fed rotates on itself. The blade 5 may be configured, in particular, for forming a weakening line defined by a plurality of facilitated fracture bridges spaced angularly apart from one another. The blade 5 may include, in particular, at least one discontinuous cutting edge 6 through the presence of a plurality of rooms or recesses 7.

The blade 5 may include, in particular, at least one cutting edge 6 shaped as a circumference arc (for example with a lie on a cutting plane parallel to a plane of the feeding path of the caps T).

The feeding path of the capsules T may include, in particular, at least one path portion P shaped as a circular sector arranged adjacent and placed parallel alongside the cutting edge 6.

The cutting unit 4 may include, in particular, an abutting arrangement or assembly 8 arranged for interacting in contact with the caps T. The abutting arrangement 8 is arranged for cooperating with the blade 5 for performing the cut on the caps T. The abutting arrangement 8 may be arranged, in particular, parallel to and alongside the blade 5.

The feeding device 2 and the cutting unit 4 may be configured, in particular, in such a manner that a cap T, when it is fed to the cutting unit 4 by the feeding device 2, can roll on the abutting arrangement 8 whilst the blade 5 performs an (at least partially circumferal) cut on a side wall of the cap T to form the weakening line.

The abutting arrangement 8 may include, in particular, at least one abutting wall, for example of cylindrical sector shape (although other embodiments can be provided in which the abutting wall has a certain conicity, in particular conicity up to about) 5° arranged next to a portion of the feeding path (at least partially circular) of the capsules T that advance in the feeding direction F and roll on the abutting arrangement 8.

The abutting arrangement 8 may include, in particular, at least one or at least two abutting walls each of which is arranged for interacting in rolling contact with a (knurled or smooth) side wall of the cap T.

The abutting arrangement 8 may include, in particular, at least one knurled or indented abutting wall 9 for promoting coupling with the cap T and resulting rolling of the cap. The knurled or indented abutting wall 9 may be intended, in particular, for coupling with knurling or indentation provided on a side wall of the cap T so as to promote rolling of the cap (rotated by a corresponding spindle 3 of the spindle-holding carousel) on the wall. The knurled or indented abutting wall 9 may be arranged, as in this embodiment, below the blade 5.

The abutting arrangement 8 may include, in particular, at least two abutting walls 9 and 10 arranged on two sides of the blade opposite one another, for example an abutting wall 9 below the blade and an abutting wall 10 above the blade 5. In the specific embodiment, the abutting arrangement 8 includes a knurled or indented abutting wall 9 arranged below the blade 5 and a smooth abutting wall 10 (without knurling or indentation) arranged above the blade 5. The two abutting walls 9 and 10 are arranged on two portions of the cutting unit 4 each of which is substantially plate-shaped. The blade 5, in the form of a thin plate, is at least partially interposed between the two aforesaid plate-shaped portions.

The cutting unit 4 may include, in particular, a first (stationary) support arrangement 11 that is fixed with respect to a base frame 12 of the cutting apparatus 1.

The cutting unit 4 may include, in particular, a second (movable) support arrangement 13 that is movable and adjustable in position with respect to the first support arrangement 11. The second support arrangement 13 is configured for supporting the abutting arrangement 8 and the blade 5.

The first (stationary) support arrangement 11 may include, in particular, a support frame that may include, in particular, a guide member 14 configured for guiding the movement of a cursor member 15 of the second support arrangement 13. The guide member 14 may include, in particular, at least one sliding guide (for example linear). The cursor member 15 may include, in particular, at least one slide coupled slidingly with the sliding guide. The abutting arrangement 8 may be coupled, in particular, with the cursor member 15 by a bush arrangement 16 (for example including two bushes) that are coupled with a respective pin member 17 (for example a pin for each bush), in which the pin member 17 is fitted to the cursor member 15, so that the blade 5 and the abutting arrangement 8, which are fitted to the second support arrangement 13, can move in a block sliding on the guide member 14.

The cutting apparatus 1 may include, in particular, a first adjustment device 18 configured for adjusting the corresponding position of the blade 5 with respect to the abutting arrangement 8. The first adjustment device 18 may be configured, in particular, for adjusting the corresponding position between the blade 5 and the abutting arrangement 8 in a blade adjustment direction R that may be, in particular, parallel to the cutting plane. The position of the blade 5, which in this specific embodiment is in the form of a sheet, may be adjusted in the adjustment direction R by a movement or sliding of the sheet, parallel to itself, between the two portions of the plate-shaped cutting unit that are located contiguously to the two opposite faces of the blade 5 and on which the two abutting walls 9 and 10 are arranged.

The first adjustment device 18 may include, in particular, a movement device, for example provided with a micrometric screw (in the specific manual drive embodiment) that permits fine and precise adjustment of the movement of the cutting edge 6, in particular of the forward movement (in the blade adjustment direction R) of the cutting edge 6 to the path of the caps T.

The first adjustment device 18 may be configured, in particular, for adjusting the corresponding position between the blade 5 and the abutting arrangement 8 in a blade adjustment direction R that may be, in particular, transverse to a straight line that is tangential to the aforesaid cutting edge 6 at an intermediate point of the length of the cutting edge 6, in particular at the median point of the length of the cutting edge 6.

The first adjustment device 18 may be configured, in particular, for moving the blade 5 both with respect to the abutting arrangement 8, and with respect to the feeding device 2 (as in the specific embodiment), or (as in other embodiments that are not shown) to move the abutting arrangement & both with respect to the blade 5, and with respect to the feeding device 2.

The cutting apparatus 1 may include, in embodiments that are not illustrated, a first drive arrangement or device M' for driving the first adjustment device 18.

The cutting apparatus 1 may include, in particular, a programmable electronic control device C configured for controlling the first drive arrangement M' so as to adjust the corresponding position between the blade 5 and the abutting arrangement 8. The programmable electronic control device C may be configured, in particular, for controlling the first drive arrangement M' with a feedback control system, for example on the basis of a measurement of the vibrations that are generated during operation on at least one part of the cutting apparatus 1. The programmable electronic control device C may be configured, in particular, for controlling the first drive arrangement M' on the basis of working life of the cutting apparatus 1 (with blade 5 wear compensation logic based on a programmed correction), and/or on the basis of a cap T being processed (for example on the basis of at least one dimension of the cap T and/or on the basis of the material of the cap T), and/or on the basis of historic data on the operation of the cutting apparatus 1 or on empirical data, and/or on the basis of a determined desired feature of the weakening line to be formed (for example the shape and/or at least one dimension of the facilitated fracture bridges that define the weakening line, so as to form bridges that are selectively stronger or weaker, longer or shorter, etc), and/or on the basis of a measured force (opening torque of the cap), for example measured on a sample cap, which is necessary for breaking the weakening line after the latter has been formed by the cutting apparatus 1.

The cutting apparatus 1 may include, in particular, a second adjustment device 19 configured for adjusting the position of the cutting unit 4 (in particular of at least one part of the cutting unit 4 that includes both the blade 5, and the abutting arrangement 8) with respect to the feeding device 2.

The second adjustment device 19 may be configured, in particular, for adjusting the corresponding position between the cutting unit 4 and the feeding device 2 in a unit G adjustment direction parallel to the feeding plane of the caps T. The second adjustment device 19 may include, in particular, an adjusting spacer 20 interposed between the cursor member 15 (slide) and at least one fixed abutting element arranged on the first (fixed) support arrangement 11.

The cutting apparatus 1 may include, in embodiments that are not illustrated, a second drive arrangement or device M" for driving the second adjustment device 19.

The cutting apparatus 1 may include, in particular, a programmable electronic control device C configured for controlling the second drive arrangement M" (so as to adjust the corresponding position between the cutting unit 4 and the feeding device 2) on the basis of a measurement of the vibrations that are generated during operation on at least one part of the cutting apparatus 1, and/or on the basis of working life of the cutting apparatus 1, and/or on the basis of a type of cap being machined (for example on the basis of at least one dimension of the cap and/or on the basis of the material of the cap), and/or on the basis of a determined desired (morphological) feature of the weakening line to be formed (for example the shape and/or at least one dimension of the facilitated fracture bridges that define the weakening line).

The adjustment of the cutting apparatus 1 may include in particular the operation of varying the corresponding position between the blade 5 and the abutting arrangement 8, in particular by advancing the blade 5 with respect to the abutting arrangement 8, where "advancing" means approaching the caps T the feeding path, for example to increase the cut depth.

The corresponding position between the blade 5 and the abutting arrangement 8 may be varied, for example, in order to compensate for wear that may have occurred to the cutting edge 6 of the blade 5 and/or for the purpose of modifying the desired parameters of the weakening line that has to be formed and/or for the purpose of adapting the cutting apparatus 1 to a new cap size.

The corresponding position between the blade 5 and the abutting arrangement 8 may be varied, as in this embodiment, by moving the blade 5 (in particular with a forward movement, in particular with a controlled movement by the movement device with micrometric screw) and leaving the abutting arrangement 8 stationary. In this movement, the blade 5, which may be in the form of a wide and flat sheet as in this embodiment, may slide interposed between the plate-shaped portions that carry the abutting walls 9 and 10. It is possible, in other embodiments that are not shown, to vary the corresponding position between the blade 5 and the abutting arrangement 8 by moving the abutting arrangement 8 (in particular with a backward movement) and leaving the blade 5 stationary.

Adjusting the corresponding position between the blade 5 and the abutting arrangement 8 may be driven, in particular, by using the first adjustment device 18, by a manual drive (on the movement device, in particular with a micrometric screw), as in the illustrated embodiment, or by a motor-driven drive (not shown, for example with a rotor that drives the movement device, in particular with the micrometric screw), for example an automatic drive controlled by a programmable electronic control device C.

Adjusting the corresponding position between the blade 5 and the abutting arrangement 8 may be combined with the adjustment of the cutting unit 4 or, to be more precise, of the set or block that includes at least the blade 5 and the abutting arrangement 8, with respect to the feeding path of the capsules T fed by the feeding device 2. In the specific embodiment, the blade 5 and the abutting arrangement 8 are carried by the cursor member 15 (slide) the movement of which is controlled by the second adjustment device 19.

The cutting apparatus 1 thus permits both adjustment of the position of the cutting unit 4 (blade 5 and abutting arrangement 8) overall and independent adjustment of the blade 5 with the respect to the abutting arrangement 8.

The invention claimed is:

1. Apparatus for cutting caps, said apparatus including:

a feeding path along which the caps are fed in a feeding direction;

a feeding device configured to feed the caps along said feeding path;

a cutting unit configured to form a weakening line on a cap fed along said feeding path, said cutting unit including at least one blade that extends along said feeding path and an abutting assembly that is independent of, parallel to and on opposite sides of said blade, said feeding device and said cutting unit being configured so that a cap, when fed to said cutting unit, can roll over said abutting assembly while said blade performs a cut on a side wall of the cap;

a first adjustment device configured to adjust a relative position of said blade with respect to said abutting assembly to at least one of compensate for wear of said blade, modify desired parameters of the weakening line, and adapt said apparatus to a new cap size;

a first device for driving said first adjustment device; and a programmable electronic control device configured to control said first device based on at least one of a measurement indicative of vibrations generated in at least one part of the apparatus, a working life of said apparatus, and a type of capsule being processed; and a second adjustment device including an adjustable spacer configured to adjust the position of said cutting unit with respect to said feeding device.

2. Apparatus according to claim 1, wherein said blade includes a cutting edge that lies on a cutting plane, said first adjustment device adjusting said relative position between the blade and the abutting assembly in a blade adjustment direction that is parallel to said cutting plane.

3. Apparatus according to claim 2, wherein said blade adjustment direction is transverse to a straight line that is tangent to said cutting edge at an intermediate point of a length of said cutting edge.

4. Apparatus according to claim 1, wherein said first adjustment device is configured to move said blade with respect to said abutting assembly and with respect to said feeding device.

5. Apparatus according to claim 1, wherein said feeding path lies on a feeding plane that is parallel to a cutting plane on which lies a cutting edge of said blade, said second adjustment device adjusting said relative position between said cutting unit and said feeding device in an adjustment direction that is parallel to said feeding plane.

6. Apparatus according to claim 1, wherein said first adjustment device includes a micrometric screw.

7. Apparatus according to claim 1, wherein said programmable electronic control device is further configured to control said first drive device based on a desired characteristic of the weakening line to be formed.

8. Apparatus according to claim 1, wherein said abutting assembly includes at least two abutment walls arranged on two sides of said blade opposite to each other, said abutment walls being arranged to interact in rolling contact with the cap.

9. Apparatus according to claim 1, wherein said blade includes at least one cutting edge in the shape of a circumferential are and wherein said feeding path includes at least one path portion that is circular and adjacent to said cutting edge.

10. Apparatus according to claim 1, wherein said abutting assembly includes at least one abutment wall that is knurled or indented to facilitate rolling of the cap.

11. Method for adjusting an apparatus for cutting caps according to claim 1, said method including the operation of varying the relative position between the blade and the abutting assembly, where said blade serves to cut the cap and form a weakening line while, during cutting, the cap is made to roll on said abutting assembly.

* * * * *